United States Patent [19]

Patterson

[11] Patent Number: 4,818,055
[45] Date of Patent: Apr. 4, 1989

[54] OPTICAL FIBER SPLICE CONNECTOR

[75] Inventor: Richard A. Patterson, Georgetown, Tex.

[73] Assignee: Minnesota Mining and Manufacturing Company, St. Paul, Minn.

[21] Appl. No.: 182,794

[22] Filed: Apr. 18, 1988

[51] Int. Cl.[4] .......................... G02B 6/36; G02B 6/38
[52] U.S. Cl. ............................. 350/96.20; 350/96.21
[58] Field of Search ............... 350/96.15, 96.16, 96.20, 350/96.21, 96.22, 96.23

[56] References Cited

U.S. PATENT DOCUMENTS

| | | | |
|---|---|---|---|
| 4,029,390 | 6/1987 | Chinnock et al. | 350/96.21 X |
| 4,077,702 | 3/1978 | Kunze et al. | 350/96.21 |
| 4,123,138 | 10/1978 | Morrison | 350/96.21 |
| 4,181,401 | 1/1980 | Jensen | 350/96.21 |
| 4,205,898 | 6/1980 | Matthews | 350/96.21 |
| 4,211,470 | 7/1980 | Stewart | 350/96.21 |
| 4,220,397 | 9/1980 | Benasutti | 350/96.21 |
| 4,254,865 | 3/1981 | Pacey et al. | 350/96.21 |
| 4,257,674 | 3/1981 | Griffin et al. | 350/96.21 |
| 4,274,708 | 6/1981 | Cocito et al. | 350/96.21 |
| 4,339,172 | 7/1982 | Leather | 350/96.21 |
| 4,352,542 | 10/1982 | Tydings | 350/96.21 |
| 4,353,620 | 10/1982 | Schultz | 350/96.21 |
| 4,368,949 | 1/1983 | Schmidt | 350/96.21 |
| 4,391,478 | 7/1983 | Melman et al. | 350/96.20 |
| 4,435,038 | 3/1984 | Soes et al. | 350/96.21 |
| 4,458,984 | 7/1984 | Roberts et al. | 350/96.21 |
| 4,489,830 | 12/1984 | Charlebois et al. | 350/96.21 X |
| 4,585,303 | 4/1986 | Pinsard et al. | 350/96.20 |
| 4,593,971 | 6/1986 | Clement et al. | 350/96.20 |
| 4,602,845 | 7/1986 | Anderton | 350/96.20 |
| 4,634,216 | 1/1987 | Calevo et al. | 350/96.21 |
| 4,707,069 | 11/1987 | Hoffman, III | 350/96.21 |
| 4,712,863 | 12/1987 | Herg et al. | 350/96.21 |
| 4,725,118 | 2/1988 | Serrander | 350/96.20 |
| 4,729,619 | 3/1988 | Blomgren | 350/96.21 |
| 4,730,892 | 3/1988 | Anderson et al. | 350/96.21 |
| 4,740,411 | 4/1988 | Mitch | 350/96.21 X |
| 4,761,052 | 8/1988 | Buekers et al. | 350/96.20 |

FOREIGN PATENT DOCUMENTS

| | | | |
|---|---|---|---|
| 0065096 | 11/1982 | European Pat. Off. | 350/96.20 X |
| 52-19547 | 2/1977 | Japan | 350/96.21 X |
| 53-26142 | 3/1978 | Japan | 350/96.21 X |
| 58-9114 | 1/1983 | Japan | 350/96.20 X |
| 58-158621 | 9/1983 | Japan | 350/96.20 X |
| 1556476 | 11/1979 | United Kingdom | 350/96.21 X |

OTHER PUBLICATIONS

Tom Ormond, Technology News, EDN, Aug. 20, 1980, pp. 35, 36, 38, 40 and 41.
Larry Stauffer, Machine Design, Jan. 7, 1988, pp. 111, 112, and 113.

Primary Examiner—William L. Sikes
Assistant Examiner—Brian Healy
Attorney, Agent, or Firm—Donald M. Sell; Walter N. Kirn; John C. Barnes

[57] ABSTRACT

A splice connector for making butt splices in optical fibers include an element formed of a deformable material and formed to define three surfaces for contacting the fibers to be spliced. The surfaces are formed between two levers of the element such that when the levers are moved toward each other the surfaces defining a fiber receiving passageway are closed onto a pair of fiber ends and the surfaces center the fiber ends and the levers afford a resilient spring compression reserve force on the aligned fiber ends to maintain them in contact. The element is placed in a plastic base and a cover, that fits onto the base, is placed over the element to close the levers of the element when the cover is closed.

15 Claims, 5 Drawing Sheets

OPTICAL FIBER SPLICE CONNECTOR

BACKGROUND OF THE INVENTION

1. Field of the Invention

This invention relates to optical fiber splicing devices for making butt splices in optical fibers and in one aspect to an improved optical fiber connector for making splices between two optical fibers and utilizing a single installation tool to complete the splice.

2. Description of the Prior Art

The art is becoming replete with devices for centering optical fibers for the purpose of aligning ends of optical fibers for splicing the ends of fibers for continued transmission of light rays along the fibers. The optical fiber used in the telecommunications industry is mostly a single mode glass fiber. This fiber typically contains a 8 $\mu m \pm 1$ $\mu m$ diameter central glass core through which the optical signal is transmitted. The core is surrounded by a glass cladding which has a diameter of 125 $\mu m \pm 3$ $\mu m$. The cladding has a slightly different index of refraction than the core.

There are a number of prior art devices which have been designed to make permanent connections or splices in single mode glass fiber. To function properly and produce a low loss splice, these devices must align the core portions of the two fiber ends being spliced to within approximately of their core diameter or less than 1 $\mu m$.

Some of the prior art devices attempt to achieve fiber end centering and alignment by forcing the fibers into a non-conformable "V" groove or between non-conformable rods. These devices function satisfactorily as long as the fibers being spliced are the same diameter. Examples of such devices are disclosed in U.S. Pat. No. 4,029,390; 4,274,708; and 4,729,619.

When the fibers to be spliced have diameters at opposite ends of the tolerance range (122 $\mu m$ and 128 $\mu m$), the non-conformable "V" groove type devices have difficulty providing the required core alignment precision.

Other prior art devices urge the two fiber center lines into alignment with one another by locating the fiber ends between three equally spaced ductile or elastomeric surfaces. These surfaces create an equilateral triangular cross-sectional channel into which the fibers are positioned. The junction between the fiber ends is located usually at the mid point of the channel. These devices provide better performance than the non-conformable "V" groove type devices because they are better able to accommodate differences in fiber diameters. Examples of these devices are found in U.S. Pat. Nos. 4,391,487; 4,435,038; and 4,593,971.

Another prior art patent is U.S. Pat. No. 4,339,172 which utilizes a foldable grip member that is placed within an elastomeric sleeve which affords compressive forces against the grip member to assert pressure on the grip member to grip each of the cables at a number of equally-spaced points around its periphery.

The device of the present invention utilizes three equally spaced contact surfaces which form a fiber centering channel as do other prior art devices, but the device contains easily definable functional and performance improvements over the prior art. These differences in structure and means of operation are discussed below.

The splicing element of the present invention provides high precision movable fiber contact surfaces and integral actuation structure affording such movement in a single easy to manufacture part. The fiber clamping surfaces are initially spaced far enough apart to allow fibers to be easily inserted into a channel or passageway until the end faces are in contact. This structure makes it easy to detect by tactile feedback and/or buckling in the opposing fiber when the first fiber is pushed against the opposing fiber in the passageway. When the fiber ends are in contact, the splice element is closed and the fiber ends are aligned and clamped. Other prior art devices such as the device of U.S. Pat. No. 4,391,487 and the commercial form sold by the assignee of U.S. Pat. No. 4,391,487 utilizes molded elastomer blocks for centering and aligning the fiber. These blocks contain an essentially triangular cross-sectional passageway which is slightly smaller than the diameter of the fibers. When the fibers are inserted into the molded passageway, they are required to force the elastomer surfaces open by elastically deforming the elastomer contact surfaces. This requires significant compressive force on the fiber to push it into the passageway. Because of this high insertion force, it is often difficult to tell when the fiber end faces are actually in contact inside the splice. Additionally, it is possible to easily break the fibers under compressive buckling as they are forced into the elastomeric centering blocks.

Only very small ductile or elastic deformation of the fiber locating surfaces is required in the splice element of the present invention to provide precise fiber centering and clamping. This deformation creates no external material flow parallel to the axis of the fiber and requires no ductile deformation of the hinged structure around the clamping surfaces. Other prior art devices such as the connector of U.S. Pat. No. 4,435,038 require extremely large deformations of the fiber clamp surfaces and surrounding structure to produce fiber centering and clamping. Unfortunately, these large deformations may result in unwanted distortion of and unequal clamp forces on the fiber engaging surfaces. This in turn may also produce shifting of the fiber center lines and for axial separation of the fiber end faces.

Forces high enough to embed the fiber uniformly into each of the clamping surfaces of the splicing element of the present invention by ductile deformation can be generated easily through the hinged lever structure afforded by the levers of the splicing element. A single small plastic case containing a sliding cap can easily produce forces large enough to move the hinged levers of the splicing element toward each other and clamp the fiber in the passageway. Other prior art devices such as the connector of U.S. Pat. No. 4,435,038 require large cumbersome crimping tools capable of producing very high localized forces to clamp the fibers in the splice structure.

Once clamped, the deformable metal splicing element of the present invention maintains uniform compressive loads on the fibers which result in high fiber tensile load retention, and excellent thermal cycling stability. The fiber clamp forces are maintained by elastic energy stored in the levers of the splicing element as well as in the clamping structure. Other prior art devices such as the connector of U.S. Pat. No. 4,435,038 tend to relax or elastically recover slightly after removal of the splice crimping tool forces. This relaxation may result in a slight loosening of the fiber in the locating channel which can lead to reduced pull out forces as well as fiber end face separation during thermal cycling.

During the fiber centering and splicing process in the splicing element of the present invention, clamping loads are generated on the fiber. Since glass has very high compressive strength, these loads tend to embed the fibers slightly into the three ductile contact surfaces forming the fiber channel in the element. These clamping loads on the fiber cladding result in excellent tensile load retention capabilities and thermal cycling stability for the splice. In addition, the application of the clamping load is easily and quickly accomplished simply by squeezing together the levers of the splice element. Other prior art devices such as the fiber centering device of U.S. Pat. No. 4,391,487 require adhesives to bond the fiber to the external splice structure beyond the fiber centering blocks. These adhesives can be difficult and time consuming to apply and to cure uniformly.

The splicing element of the present invention has also been designed to permit reuse. If it becomes necessary to remove fibers from or reposition fibers within the splice, the clamping force provided by the levers of the element can be easily removed, and the elastic memory in the levers and hinge sections will cause the fiber locating and clamping surfaces to move apart or reopen. The clamping loads on the fibers are then released, and the fibers can be withdrawn, rotated or repositioned. Other prior art devices such as the connectors of U.S. Pat. Nos. 4,391,487 and 4,435,038 are permanently crimped or adhesively bonded and cannot be reused. The splice element is mounted in a housing that receives the ends of the fibers to be spliced and contains chamfered openings that direct the fibers into the element. A cap portion of the connector fits over the splice element and into the housing to cam the levers of the splice element closed to complete the splice.

SUMMARY OF THE INVENTION

A connector for making butt splices between two optical fibers according to the present invention is self contained and includes an element for receiving and aligning the optical fibers, a base for supporting the element and a cap for camming the element tightly onto the optical fiber. The element comprises a rib having a first support surface for a fiber and a pair of levers having fiber supporting surfaces which levers are pivoted in relationship to said rib to force said supporting surfaces against optical fiber ends disposed therebetween and align their axes.

The element more specifically comprises a folded sheet formed in one surface with two parallel grooves having converging walls which define, therebetween, a rib having a fiber supporting surface. The other walls of the grooves are separated at their base portions from the converging walls by land areas at which the sheet is folded. The other walls extend from the land areas at which the sheet is folded to the one surface of the sheet in which the grooves are formed and define two additional fiber supporting surfaces which together with the fiber supporting surface of the rib form a passage for receiving an optical fiber when the sheet is folded. The sheet has edge portions which diverge from each other and extend past the passageway to define the pair of levers which are used to drive the fiber supporting surfaces together. These levers cammed toward each other to reduce the size of the passageway and bring the fiber supporting surfaces against circumferentially spaced areas of the optical fibers for aligning their axes. The levers are urged together and held in fiber clamping position by closing the cap onto the base.

The splicing element is preferably made of a material having an elastic yield strength sufficient to clamp the fiber supporting surfaces against a fiber and ductile enough to embed the fibers into the supporting surfaces. A preferred material is aluminum which is ductile at stress levels about 6 to 8 ksi but elastic at lower stress levels to afford sufficient elasticity to maintain a continual compressive force on the optical fibers once the levers have been brought together.

The base in the splice connector provides means for supporting the deformable metal splicing element and has openings for directing the ends of optical fibers to be connected into the element. Cap means are provided to urge the edge portions of the element together to hold the same resiliently against the optical fibers. The squeezing of the levers is afforded by parallel transversely spaced cam bars on the sides of the cap which receive the levers of the splicing element therebetween and bring the fiber supporting areas against the optical fiber or more generally against the cladding on the optical fiber with sufficient force that the three surfaces are deformed by the fiber. Should the two fibers differ in outside diameter the deformation of the surfaces may vary due to the two sizes of fibers but the surfaces will be deformed by both fibers to align the axes of the two fibers.

The connector is preferably reopenable and is provided with means for retaining the element in the base which are separate from the cap so the cap can be lifted back to its original open position without raising the element from the base.

BRIEF DESCRIPTION OF THE DRAWING

The present invention will be further described with reference to the accompanying drawing, wherein.

DESCRIPTION OF THE PREFERRED EMBODIMENT

The present invention will be described with reference to the accompanying drawing wherein FIGS. 1 through 6 illustrate a deformable metal splice element, generally designated 11, for use in the optical fiber connector of the present invention. The splice element is formed from a sheet 12 of a ductile deformable elastic material. The sheet 12 has a pair of parallel grooves 14 and 15 formed generally centrally thereof which grooves define therebetween a rib 16 having an optical fiber supporting surface 18. The sheet 12 has edge portions 20 and 21 on either side of the grooves 14 and 15 which form levers that serve as means for drawing the fiber supporting surfaces on the sheet toward each other to align the axes of fibers positioned in a passageway defined by the supporting surface 18 and two additional surfaces by affording deforming compressive engagement therewith.

Figure 5:
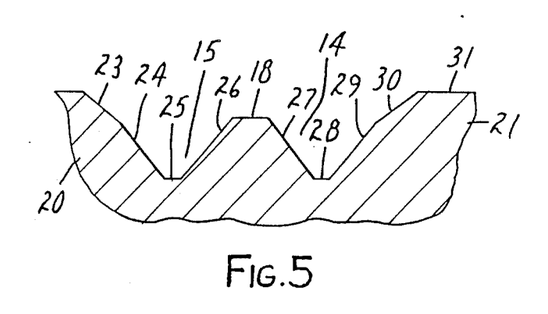
FIG. 5 is an enlarged fragmentary cross-sectional view of the sheet of FIG. 1.
Figures 6, 7:
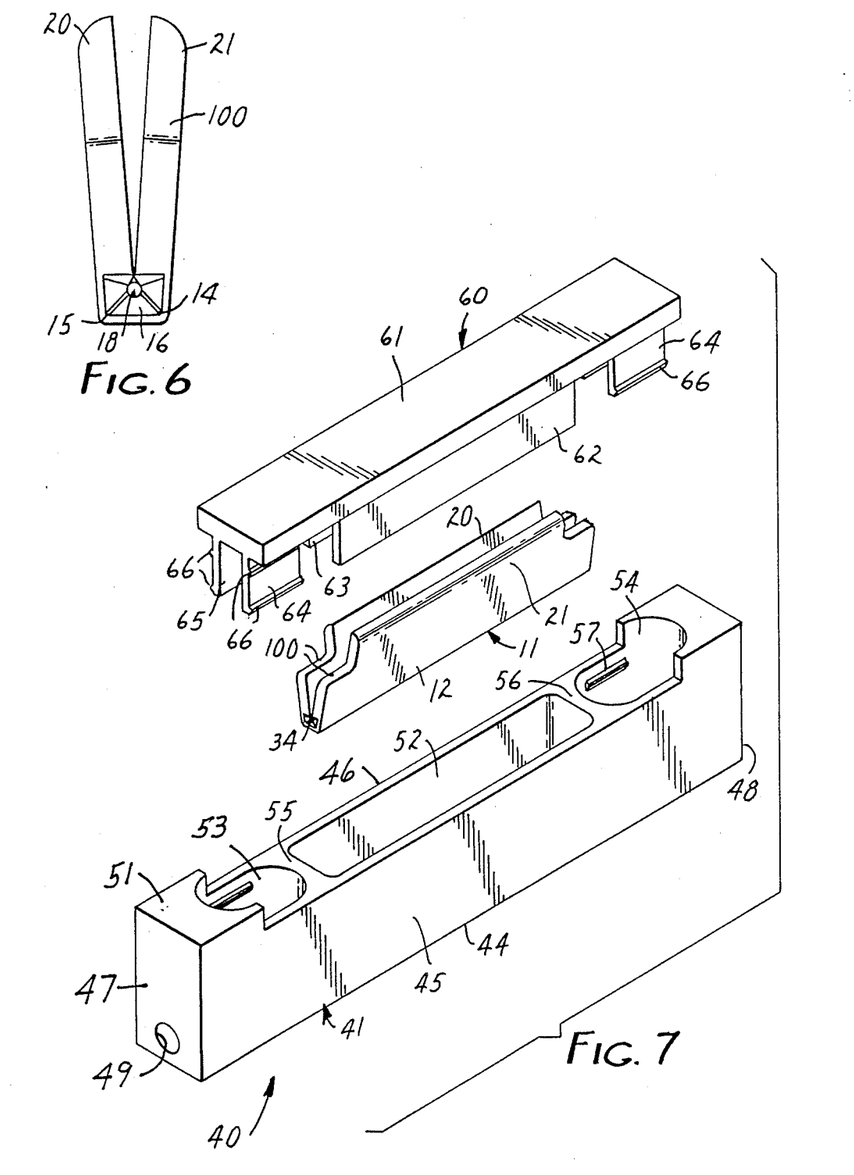
FIG. 6 is an end view of a splice element with an optical fiber disposed in the closed element.
FIG. 7 is an exploded perspective view of the splice connector incorporating the splice element of FIGS. 1 through 5.
Figure 8:
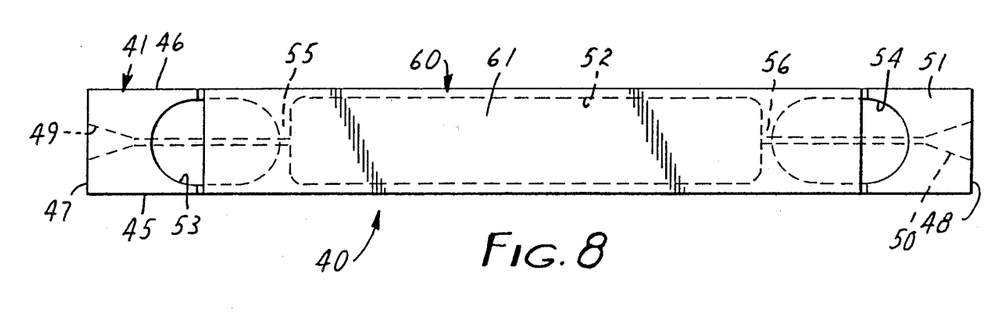
FIG. 8 is a plan view of the connector of FIG. 7.
Figure 9:
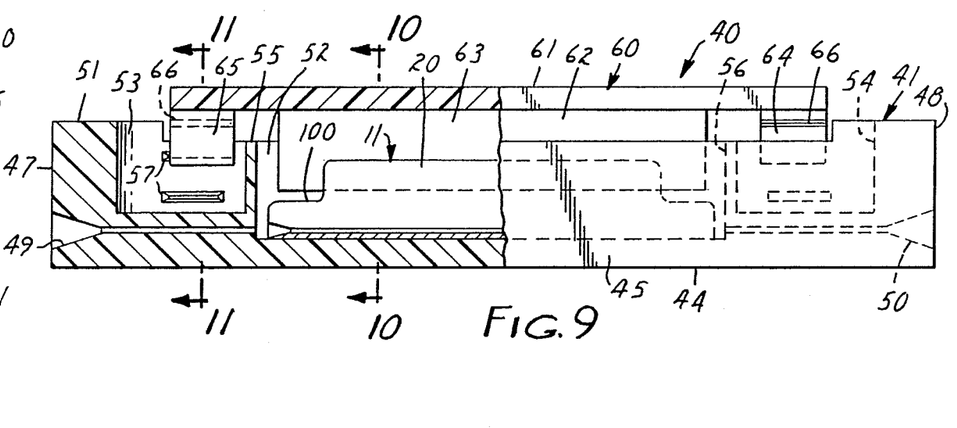
FIG. 9 is a front elevational view of the splice connector of FIG. 8, partly in section to show interior portions.
Figure 10:
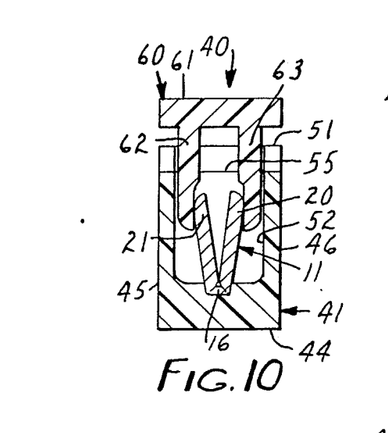
FIG. 10 is a sectional view taken along the line 10—10 of FIG. 9.
Figure 11:
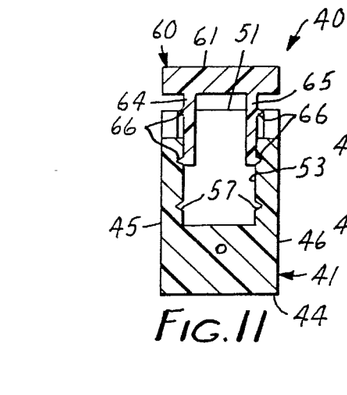
FIG. 11 is a sectional view taken along the line 11—11 of FIG. 9.

Referring now to FIG. 5 there is shown in enlarged scale the shape of the grooves 14 and 15. The sheet is stamped, coined or molded to provide preferably nine surfaces formed in the face or surface 31 of the sheet 12. The surface 23 is disposed at an angle of 55° to a vertical line or line perpendicular to the face of the sheet to form one optical fiber supporting surface, surface 24 is disposed at an angle of 42.5° to the vertical and together with surface 23 form one wall of the groove 15. The base of the groove 15 is defined by a land area 25 along which the sheet 12 is folded to form the pivot line for the side portion 20 to move surface 24 near a surface 26 forming a wall of the groove 15 and one side of the rib 16. The rib 16 has the surface 18 defining a support surface and the other wall or surface defining the rib is surface 27. The base of the groove 14 has a land area 28 joined to wall 27 and a first part or surface 29, corresponding to surface 24, and surface 30 corresponding to surface 23, forming the other wall of groove 14. Surfaces 26 and 27 are disposed at an angle of 42.5° to the vertical line. The surface 18 is recessed from the primary surface 31 of the sheet 12 sufficiently that when the sheet 12 is folded at the land areas 25 and 28 to dispose the side portions or levers 20 and 21 at 15° to 20° apart, the surfaces 23, 18 and 30 will be disposed to form a passageway to accept the desired sized fiber easily and engage the surface of a cylindrical fiber placed within the passageway at locations approximately 120° apart. This is generally illustrated in FIG. 6. Surfaces 18, 23, 24, 25, 26, 27, 28, 29, and 30 may also be curved slightly transversely about an axis instead of being planes but straight longitudinally. The only restriction on the surface geometry is that the 3 contact surfaces 23, 18, and 30 produce a channel with lines of contact spaced at approximately 120° internals around the circumference of the fiber to engage the fibers substantially uniformly along the length of the fiber ends in the element.

Figure 1:
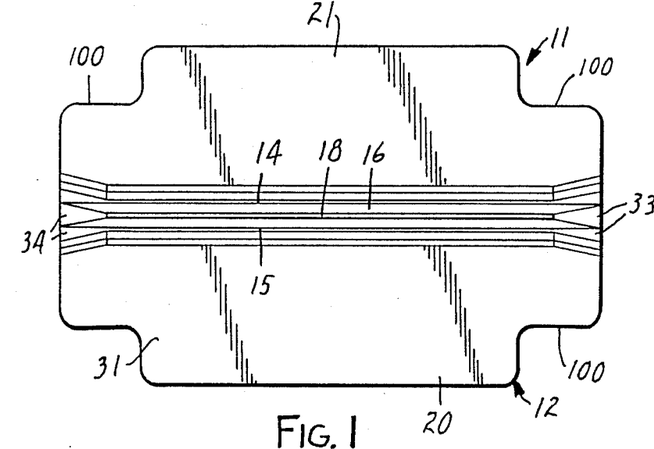
FIG. 1 is a plan view of the sheet forming the splice element.
Figure 2:
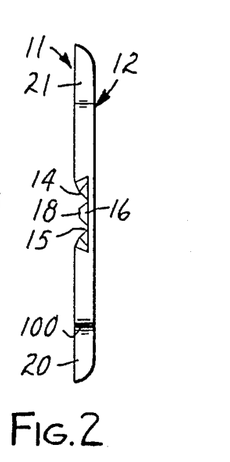
FIG. 2 is an end view of the sheet of FIG. 1.
Figure 3:
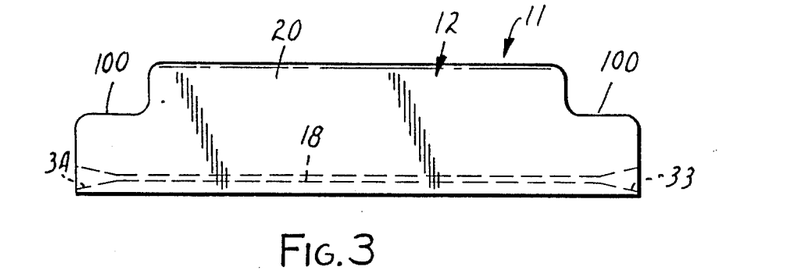
FIG. 3 is a side view of the splice element of the present invention after the sheet has been folded.
Figure 4:
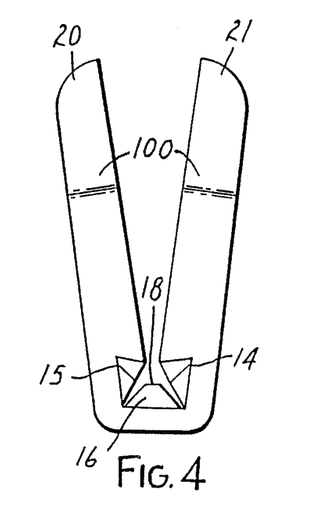
FIG. 4 is an end view of the splice element ready to accept an optical fiber.

The sheet 12 is provided with bevelled, flattened or flared surfaces 33 and 34 at opposite ends of the rib 16 and side walls of the grooves 14 and 15. These flattened areas 33 and 34 define funnel like entrance areas into the passageway defined by the surfaces 23, 18 and 30 of the splice element.

The sheet 12 is preferably formed of a metal, such as an aluminum sheet of 0.5 mm (0.020 inch) thick alloy 3003 with a temper of 0. The hardness of the material can be between 23 and 32 on the Brinnell scale (BHN) and the tensile yield strength can be between 35 to 115 MPa (Mega pascals) (5 to 17 ksi). Another alloy is 110° with a temper of 0, H14 or H-15, and a tensile yield strength and a hardness within the ranges recited above. Both alloys provide a material which is softer than the glass of the optical fiber and the cladding but ductile under the clamping pressures applied to the optical fibers. Such deformation is sufficient that the surfaces 23, 18 and 30 conform to the optical fibers contacted and should one fiber be larger than another, the surfaces will deform sufficiently to clamp onto both fiber ends and be deformed even by the smallest of the two fibers. Thus, the splice element 11 will center the core portions of the optical fibers in aligned position such that 90% or better of the surfaces of the core portions will be aligned. The material of the sheet 12 is also resilient such that the elastic limit of the material in the hinge areas and levers is not exceeded when the sheet is folded to contact a fiber therein. The elasticity of the material is such that the levers 20 and 21 will maintain a compressive force on the optical fiber after the splice is made to restrict the fibers from pulling out or the centers of the fibers from shifting from their position of alignment with each other. This continued spring compression also restricts changes in the performance of the splice with changes in temperature. The reserve forces of this spring compression are always present when the splice has been completed.

The fibers are retained in the element such that the tensile load retention will exceed the tensile strength of the glass fiber.

In a preferred example, the surface 18 has a width of 0.152 mm (0.0060 inch) and is recessed 0.109 mm (0.00433 inch) from the surface 31. From the center line through the rib 16 to the base of surfaces 26 or 27 is 0.317 mm (0.0125 inch), the width of surfaces 25 and 28 is 0.0838 mm (0.0033 inch). The distance from the center line through the rib 16 to the junction between surfaces 23 and 24 is 0.582 mm (0.0229 inch) and from the center line to the junction between surfaces 23 and 31 is 0.833 mm (0.0328 inch). The sheet 12 is normally 17.78 mm (0.7 inch) long by 7.62 mm (0.3 inch) wide along the major edges.

In tests, twenty sample elements were made using the geometry and dimensions defined above. Ten elements were made from 1100 series aluminum of 0 temper and ten samples were made in 1100 series aluminum of H15 temper. The same single mode fiber was used in making the splices in all sample elements. The average insertion loss for the H15 temper samples was approximately 0.10 db and for the 0 temper samples it was approximately 0.15 db. In thermal cycling tests where the elements were subjected to 78° C. for one hour, room temperature for one hour, one hour at −40° C., one hour back at room temperature, etc., showed a variation of less than 0.1 db loss over two weeks. Tests for insertion loss were made using a Hewlett packard Model 8154B, 1300 μm LED source and a Hewlett Packard Model 8152A Optical Average Power Meter.

FIG. 7 shows one embodiment of an optical fiber connector constructed according to the present invention, which connector is generally designated 40 and comprises a base 41, the splice element 11 and a cap 60. The base 41 and cap 60 are preferably formed of a rigid high temperature stable plastic material. The base 41 is a generally box like member with a recess in one wall, forming an element receiving cavity, and chamfered fiber receiving openings in each end communicating with the recess to direct fibers into the element 11. The base illustrated in FIGS. 7, 8, 9, 10, and 11 comprises a bottom wall 44, transversely spaced side walls 45 and 46, end walls 47 and 48, formed with the optical fiber receiving openings 49 and 50, and a top wall 51, recessed with a central elongate element receiving recess 52 and two end recesses 53 and 54. The recesses 53 and 54 are separated from the recess 52 by wall members 55 and 56 respectively and are not cut into the block as deeply as the central recess 52. The inside opposed surfaces of the walls of the recesses 53 and 54 are formed with one or more shoulders 57 forming catches which cooperate with detent means on the cap 60 to retain it in place.

The cap 60 affords means for engaging the levers of the splicing element and for urging the same toward each other uniformly to secure the ends of optical fibers in the element in an aligned light transmitting relationship with each other. The cap 60 comprises a top pressure receiving lid 61 having on one surface a pair of parallel transversely spaced cam bars 62 and 63 and a pair of detent means which cooperate with the shoulders 57 in the recesses 53 and 54 to lock the cap 60 initially in a cap retaining position or set position and secondly in a cap locked position with the splicing element closed onto the fibers. The detent means illustrated include a pair of transversely spaced walls 64 and 65 depending from the surface of the lid 61 opposite the pressure receiving surface and adjacent each end of the lid 61. The walls 64 and 65 are positioned to have an interference fit with the recesses 53 and 54 and have detents 66 on their outer facing surfaces cooperating with the shoulders 57 such that when the cap 60 is placed on the base 40 it is retained against displacement and when forced into the base to place the cam bars 62 and 63 deeply into the recess 52 the detents 66 lock the cap in the splice forming position and the bars cam the levers toward one another.

The splice element 11 normally has a gel disposed in the area of the fiber receiving passageway which has index of refraction matching characteristics to the core glass to improve the continuity of the transmission through the splice.

When the connector is assembled as shown in FIGS. 8 through 11 the element 11 is disposed in the recess 52 and held in a fiber receiving position by the cap 60 retained on the base in a set position. The chamfered openings 49 and 50 extend in from the end walls 47 and 48, beneath the bottom walls of the recesses 53 and 54, in aligned position with the fiber passageway of the element 11. When the free ends of two fibers to be spliced are positioned in the connector, one into each opening 49, 50 to meet at approximately the center of the element passageway, a closing force is applied against the lid 61 of the cap and against the bottom wall 44 of the base to drive the cam bars 62 and 63 over the levers 20 and 21 of the splicing element 11 to urge or cam the fiber supporting surfaces 23, 18 and 30 onto the fiber ends for centering the fibers and making the splice therebetween.

FIGS. 12, 13, 14 and 15 disclose a further embodiment of the optical fiber connector of the present invention. This connector, generally designated 70, is adapted to form a splice between two optical fibers, but it provides a connector which can also be reopened to allow removal of the fiber ends if it is desired to open the splice for any reason.

The connector 70 comprises a base 71, the splice element 11, two end inserts 72 and 73, and a cap 75. The base 71 is formed of a rigid material and is a generally box-like member with a recess in one wall, forming an element receiving cavity, and insert receiving openings in each end communicating with said recess to position therein two inserts which, with the base, define two fiber receiving passages for directing the optical fibers into the element 11. The base illustrated in FIGS. 12, 13, 14 and 15 comprises a bottom wall 76, transversely spaced side walls 77 and 78, end walls 79 and 80, formed with the insert receiving openings 81 and 82, and a top wall 83, recessed with a central elongate element receiving recess 84. The side walls 77 and 78 are recessed to receive the sides of cap 75. The insert receiving openings 81 and 82 communicate with the recess 84 to allow the insertion of the end inserts 72 and 73 to a locking position with the splicing element 11 as will be hereinafter explained. The inside opposed surfaces of the walls 77 and 78 defining the ends of the recess 84 are formed with one or more shoulders 85 forming catches which cooperate with detents on the cap 75 to retain it in place.

Figures 12, 15:
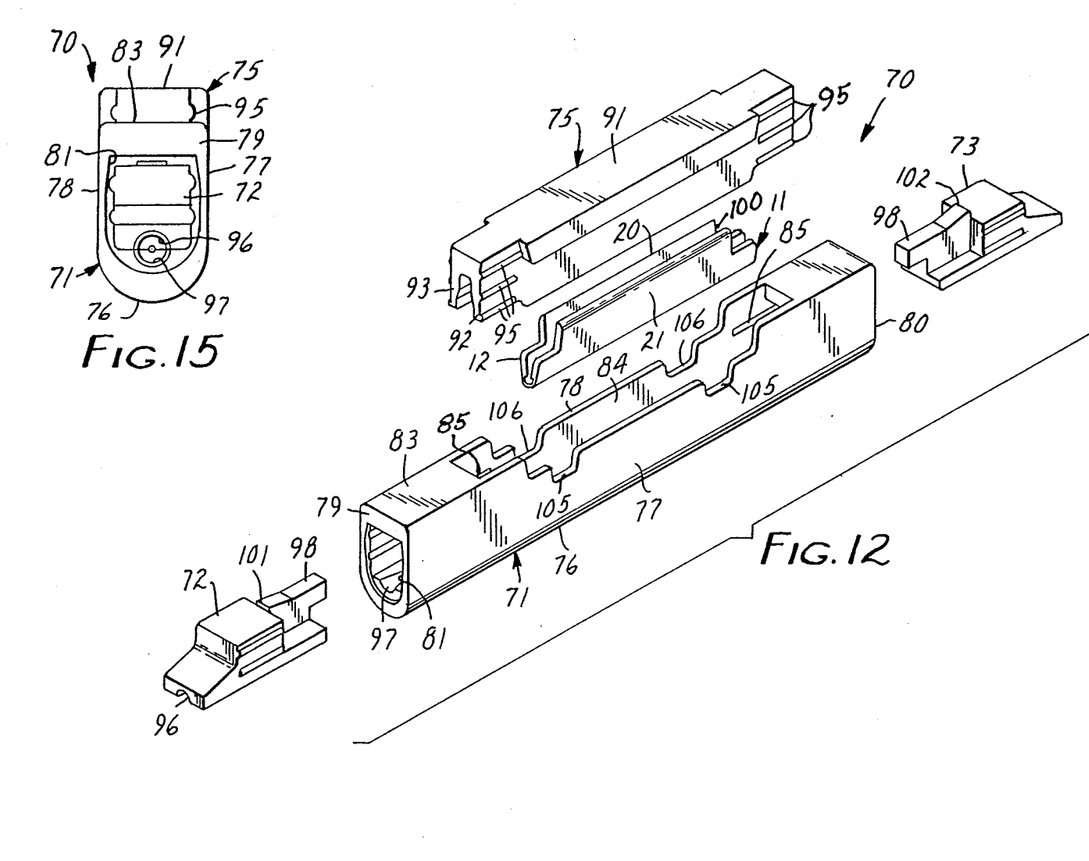
FIG. 12 is an exploded perspective view of another embodiment of a splice connector.
FIG. 15 is an end view of the connector of FIG. 14.
Figure 13:
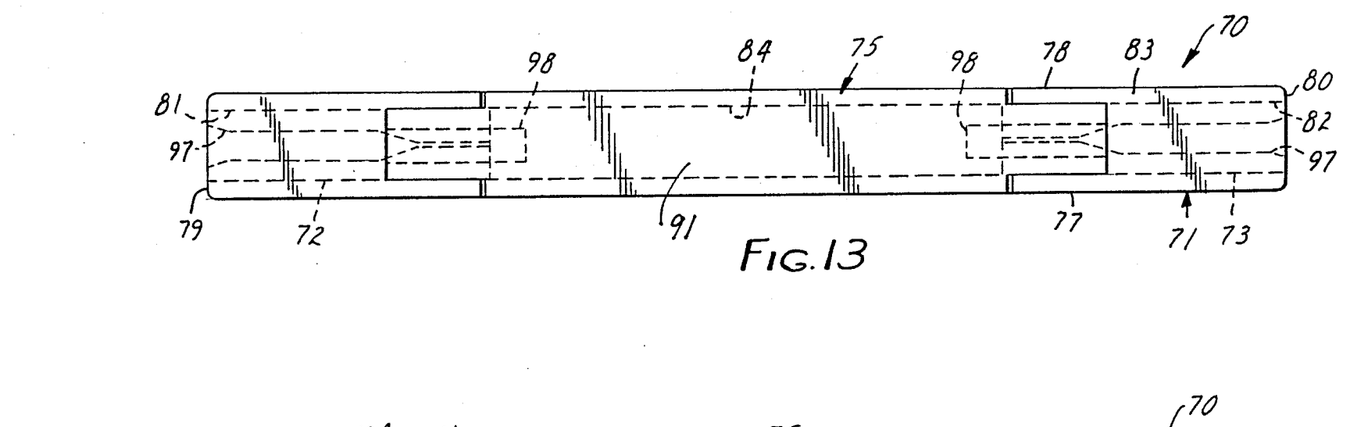
FIG. 13 is a plan view of the connector of FIG. 12.
Figure 14:
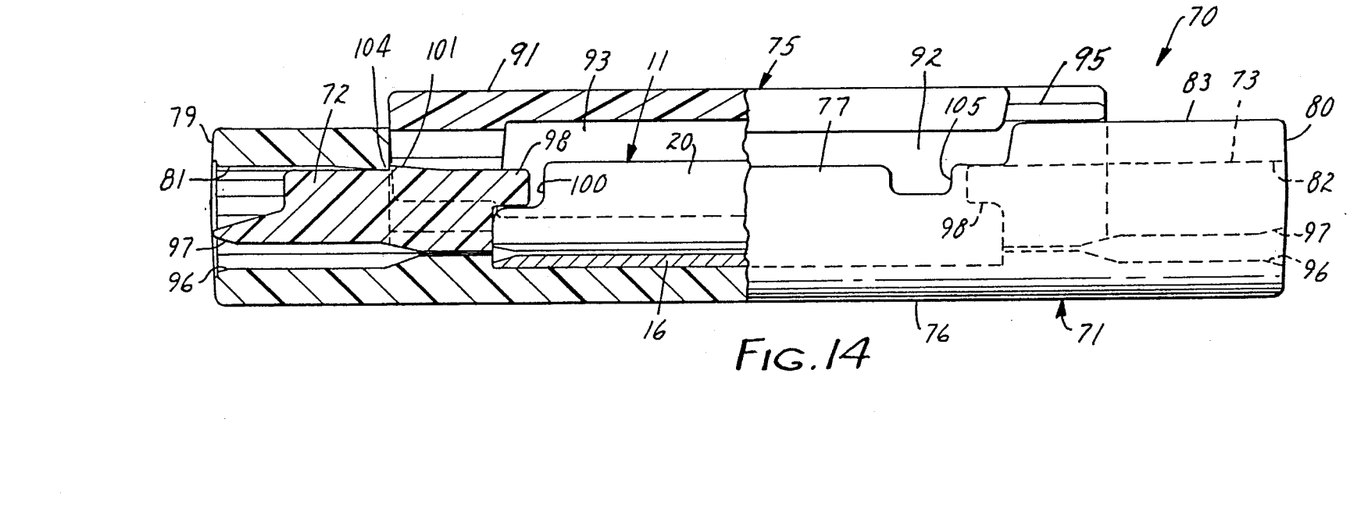
FIG. 14 is a front elevational view of the connector of FIG. 13, partly in section to show interior parts.

The cap 75 affords means for engaging the levers 20 and 21 of the splicing element 11 and for urging the same toward each other uniformly to secure the ends of optical fibers in the element into an aligned position with each other. The cap 75 comprises a top pressure receiving lid 91 having on one surface a pair of transversely spaced cam bars 92 and 93 having opposed inner diverging surfaces and extended ends. The extended ends of the pair of bars 92 and 93 are formed with detent means which cooperate with the shoulders 85 in the recess 84 to position the cap 75 initially in a cap retaining position or set position and secondly in a cap locked position with the splicing element 11 closed onto the fibers. The detent means illustrated include protruding detents 95 positioned to have an interference fit with the inside surfaces of the walls 77 and 78, an particularly with the shoulders 85, such that when the cap 90 is placed on the base 71 it is retained against displacement and when forced into the base to place the bars 92 and 93 into the recess 84 between the side walls 77 and 78 the detents lock the cap in the splice forming position. The cap 75 is also provided with projecting sides on the bars 92 and 93 to be received in recessed areas along the upper sides of the side walls 77 and 78.

The end inserts 72 and 73, as illustrated in FIGS. 1 2, 13 and 14, are formed for insertion into the openings 81 and 82 of the base. The inserts are formed on their lower surface with semicircular grooves 96 which cooperate with semicircular grooved surfaces 97 formed in the lower part of the openings 81 and 82 to define fiber receiving passages. The passages so formed cooperate and are aligned with the passageway in the splicing element 11 to guide optical fibers into the element. The end inserts 72 and 73 also have tongues 98 which extend into the element receiving cavity 84 to a position for retaining the element 11 in the cavity. The notches 100 in the corners of the sheet 12 defining the element 11, see FIG. 1, afford a recess to receive the tongues 98 of the end inserts affording the interference between the parts to retain the element in the base. The tongues 98 are positioned inside and below the ends of the cap 75 and the associated detent means, but do not interfere with the bars 92 and 93 moving over the levers 20 and 21 to close the element onto the fibers.

Formed on the end inserts 72 and 73 are also detents 101 and 102 for retaining the inserts 72 and 73 in the base. The detents 101 and 102 are positioned between the body of the insert and the tongues 98. The detents 101 and 102 engage shoulders 104 formed at the position on the top wall 83 where the openings 81 and 82 intersect the cavity 84. With the inserts 72 and 73 in place the detents 101 and 102 and shoulders 104 hold them from displacement. The end inserts 72 and 73 will thus hold the splicing element 11 from being displaced upward by the bars 92 and 93 if it is later desired to lift the cap 75 off of the base, even after making a splice. The cap 75 may be lifted back to its original set position by forcing it to became released from the detents urging a locking engagement with the base. Notches 105 and 106 are formed in the recessed areas of the side walls 77 and 78 respectively to provide spaces between the projecting sides of the bars 92 and 93 on the cap and the base for insertion of jaws of a removal tool to lift the cap back to its original set position before splicing.

When the splice connector 70 is assembled as shown in FIGS. 12 through 15, the element 11 is disposed in the recess 64 and held in a fiber receiving position by the cap 75 retained on the base 71 in a set position and by the end inserts 72 and 73. When the free ends of two fibers to be spliced are inserted into the passages formed between the end inserts and the base and are positioned in the connector element 11 to approximately the center of the element passageway, a closing force is applied against the cap 75 and against the bottom wall 76 of the base to drive the cam bars 92 and 93 over the levers 20 and 21 of the splicing element 11 to close the fiber supporting surfaces 23, 18 and 30 onto the fiber ends making the splice therebetween.

The bases, caps and end inserts of the splice connectors are preferably molded from a glass loaded polymeric formulation identified as Vectra A130 available from Engineering Plastics Division of Hoechst Celanese Corporation of Chatham, N.J., U.S.A. This material has a high heat deflection temperature and will not cold flow under the pressures applied by the levers 20 and 21.

The splice connectors thus described provide connectors which are readily usable in the field to make butt splices between optical fibers by applying sufficient force against the cap to close the same onto the base. The parts are formed to fit together such that the closing force is applied generally uniformly along the levers of the splicing element to engage the optical fiber ends and emboss the surfaces 23, 18 and 30 by the fibers to center and retain the fibers in their proper aligned positions.

Having described the present invention with reference to the preferred embodiments it will be appreciated the other changes may occur without departing from the spirit or scope of this invention.

I claim:

1. A splice connector for making butt splices between two optical fibers comprising a base of having a bottom, top, opposed side walls and end walls, means for defining a cavity in said top wall and for defining aligned openings communicating with said cavity in said end walls, a splice element inserted in said cavity and comprising central rib means having a first elongate fiber supporting surface and a pair of lever means pivoted about opposite edges of said rib means and diverging therefrom, said lever means each having an elongate fiber supporting surface positioned adjacent said first fiber supporting surface to form a passageway for optical fibers and for engaging said fibers at spaced positions around said fiber, said lever means being initially disposed to diverge from said rib means and being formed for movement toward each other to grasp said optical fibers therebetween and splice ends of two fibers in aligned position, and a cap having a top, and depending bar means on one surface of said top for receiving the diverging lever means of said element therebetween and for camming said lever means toward each other, said cap being disposed on said base with said bar means in said cavity and with said diverging levers of said element dispose therebetween whereby movement of said cap into said base to close said cavity will urge said lever means toward one another bringing said supporting surfaces against said optical fibers and align the ends thereof in the passageway and to retain said ends in aligned relationship.

2. A splice connector for making butt splices between two optical fibers comprising a body member of generally rectangular configuration having a bottom, top, opposed side walls and end walls, means for defining a cavity in said top wall and for defining aligned openings communicating with said cavity in said end walls, a formed splice element comprising a thin sheet of deformable resilient material having a central rib defined between two grooves the bottoms of which define fold lines about which the sheet is folded to bring the sides thereof about said rib to form a passageway for an optical fiber and said element being disposed in said cavity with said passageway communicating with said openings, said sides of said element being initially disposed to diverge from said rib and being formed to be urged toward one another to grasp a said optical fiber therebetween, and a cover having a top, depending diverging bars on one surface thereof to receive the diverging sides of said element therebetween, said cover being disposed with said bars in said cavity with said diverging sides of said element disposed therebetween whereby movement of said cover into said base to close said cavity will cam said sides against said optical fibers when disposed therein and align the opposed ends thereof in the passageway to retain said ends in aligned abutting relationship.

3. A connector for making butt splices for optical fibers comprising a body member having a bottom, opposed side walls and end walls, said side and end walls having inner surface portions defining a cavity, and said end walls having aligned openings communicating with said cavity, deformable metal splicing means for aligning ends of two optical fibers comprising a thin metal sheet having a central rib defined between two grooves, the bottoms of which define fold lines about which the sheet is folded to bring the sides thereof about said rib to form a passageway for optical fibers, said splicing means being disposed in said cavity with said passageway communicating with said openings, said sides of said sheet being initially disposed to diverge from said rib and being formed to fold together to grasp optical fiber between the free edge of said rib and said sides for aligning said ends, and closure means for bringing said diverging sides of said splicing means together, said closure means being supported by said body member to close said cavity and cam said sides of said splicing means against a said optical fiber and align the abutting ends thereof in the passageway to retain said abutting ends in aligned abutting relationship.

4. A connector according to claim 3 wherein said closure means is a cap having a wall member to close the open side of said cavity opposite said bottom wall and having depending walls to receive therebetween said diverging sides of said splicing means whereby the movement of said cap into said cavity to bring said depending walls to a position to close said cavity forces said sides of said splicing means to contact optical fibers therein and embed said ends into said free edge and said sides.

5. A connector according to claim 3 wherein said closure means comprises a cover having a wall to close said cavity, a pair of spaced cam bars on the inner surface of said wall formed for receiving therebetween said diverging sides of said splicing means, and detent means for holding said cover in position on said body member.

6. A connector for making reopenable butt splices for optical fibers comprising a body member of a generally rectangular shape having a cavity in one surface and openings in its opposed ends communicating with said cavity, fiber splicing means disposed in said cavity having a fiber receiving passageway for centering and aligning the ends of two abutting fibers upon the restricting of said passageway and having two diverging members resiliently urged toward one another for restricting said passageway and clamping fibers therein, means disposed in said openings in the ends of said body member for retaining said fiber splicing means and for defining chamfered holes for guiding an end of a said optical fiber into said splicing means, and a cover having a top wall and depending cam bars on one surface thereof to receive said two diverging members of said fiber splicing means and urge the same toward each other, said cover being disposed with said bars in said cavity and said diverging members therebetween whereby movement of said cover into said body member to close said cavity will urge said diverging members against said optical fibers and align the opposed ends thereof in said passageway and retain said ends in aligned abutting relationship.

7. A connector according to claim 6 wherein said splicing means comprises an element formed from a thin sheet of deformable material having opposite surfaces and longitudinal sides, a pair of parallel grooves formed in one surface, two of the walls defining said grooves form a rib having equal converging sides and a narrow first fiber supporting surface therebetween, the other two side walls forming the grooves are separated at their base portions from said two of the walls by land areas at which said sheet is folded, and said other two side walls extend from said land areas to said one surface of said sheet and include surface areas defining two additional fiber supporting surfaces which are disposed in an angular relationship to each other and with said first fiber supporting surface of said rib which surfaces collectively define said fiber receiving passageway, and the sides of said sheet parallel to said grooves form said two diverging members which serve to draw said supporting surfaces toward one another upon movement of the sides toward one another to engage said fiber ends and clamp them in axially aligned position.

8. A connector according to claim 7 wherein said sheet is formed of a material having sufficient elastic yield strength to permit the diverging members to clamp said surfaces against a said fiber to embed a said fiber into said fiber supporting surfaces.

9. A connector according to claim 7 wherein said material is metal.

10. A connector according to claim 9 wherein said sheet is formed of an aluminum alloy having an elastic yield strength of between 35 and 115 MPa.

11. A connector according to claim 8 wherein said sheet is formed of aluminum and the sheet is about 0.57 mm thick.

12. A connector according to claim 11 wherein said aluminum sheet is aluminum alloy 3003.

13. A connector according to claim 12 wherein said aluminum has a 0 temper.

14. A connector according to claim 11 wherein said aluminum is alloy 1100 having a 0 temper.

15. A connector according to claim 11 wherein said aluminum has a temper of one of 0, H14 and H15.

* * * * *